3,330,955
MAST-SUPPORTED SELECTOR TUBE AND CARREL IN ELECTRONIC STUDY SYSTEM
Chester J. Barecki, Bror W. Henrikson, and William R. Dufendach, Grand Rapids, Mich., assignors to American Seating Company, Grand Rapids, Mich., a corporation of New Jersey
Filed Mar. 5, 1965, Ser. No. 437,373
4 Claims. (Cl. 250—199)

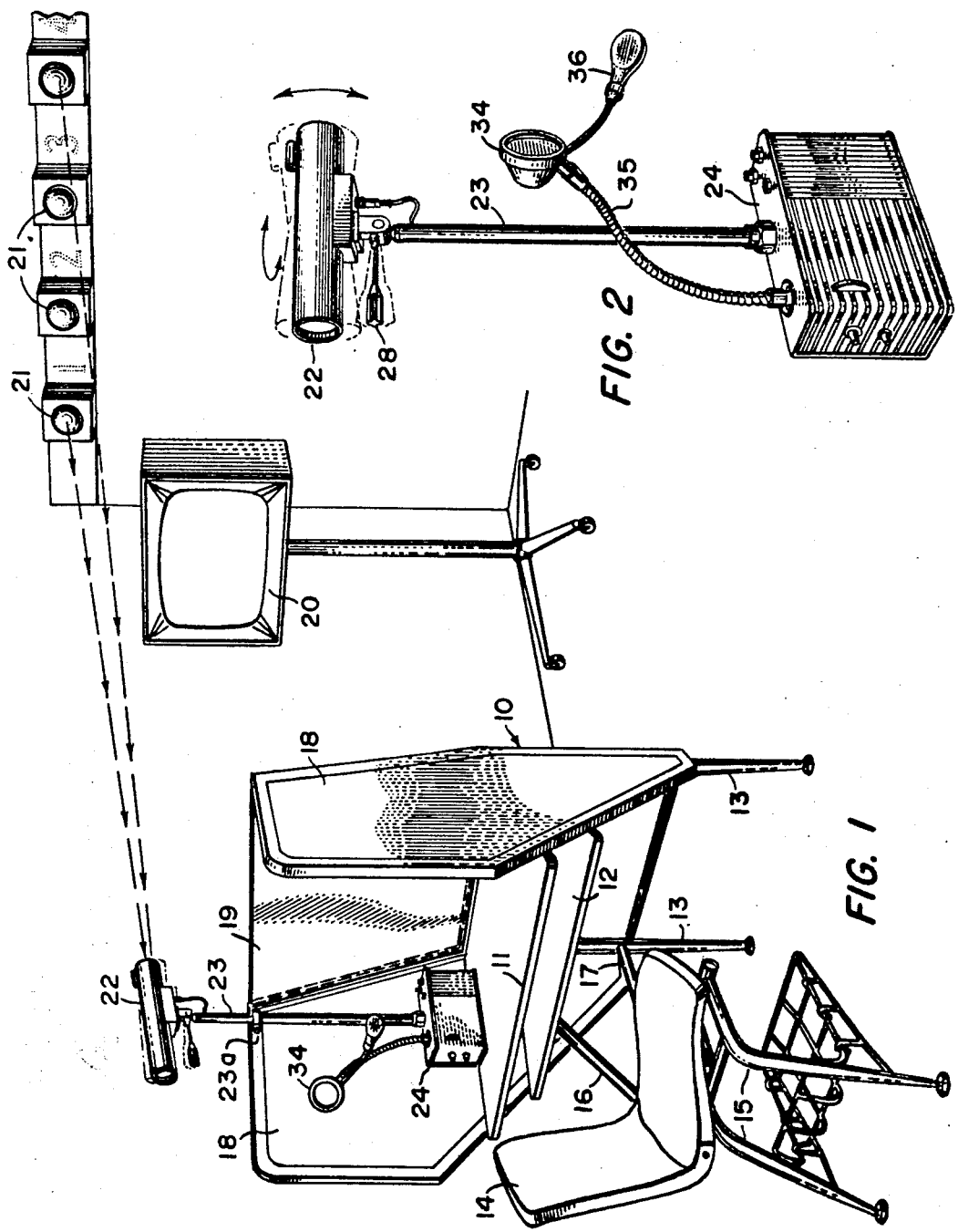

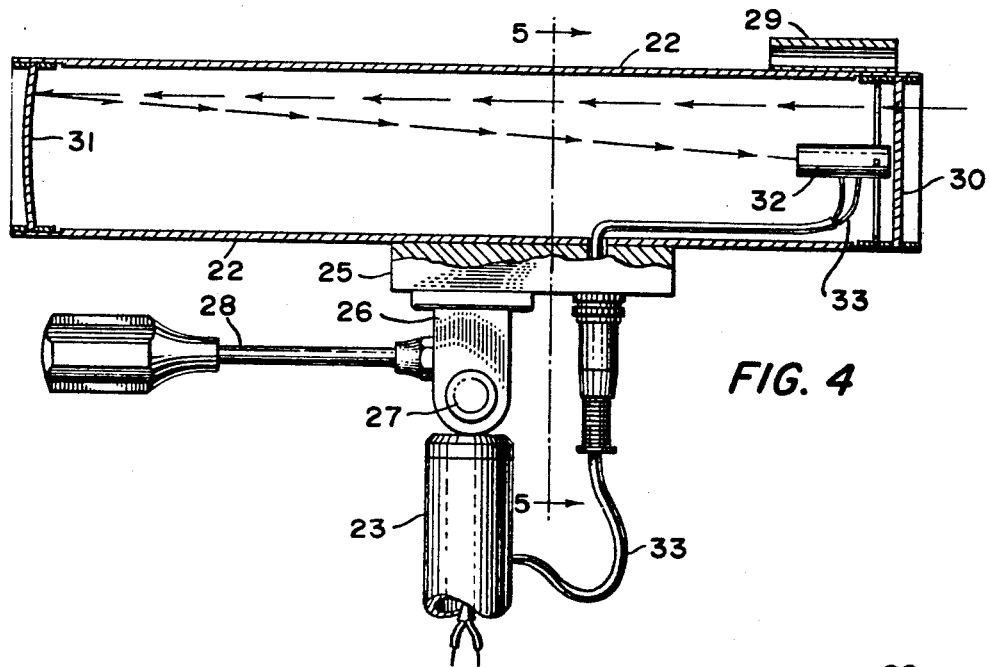
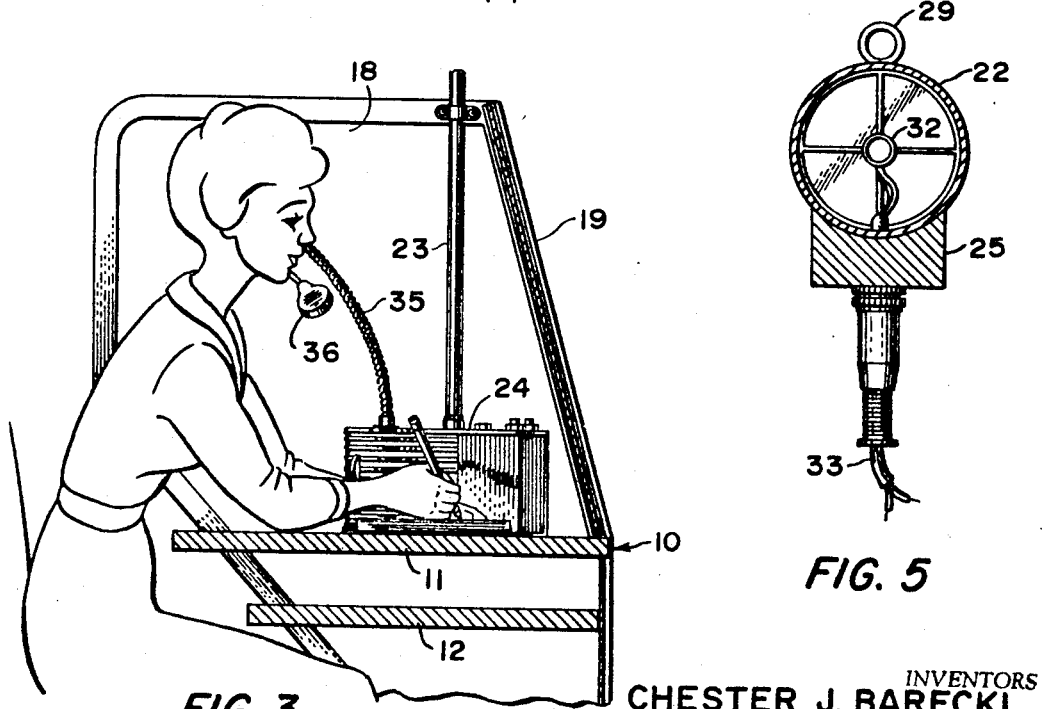
FIG. 4
FIG. 5
FIG. 3
INVENTORS
CHESTER J. BARECKI
BROR W. HENRIKSON
WILLIAM R. DUFENDACH
BY Dawson, Tilton, Fallon, Lungmus, and Alexander
ATTORNEYS
WITNESS
Harry S. Brown Jr.

ABSTRACT OF THE DISCLOSURE

A plurality of spaced-apart sound-modulated light beam emitting sources are arranged in a line at an elevation in a study chamber. A carrel on the floor of the chamber faces the sources and is provided with a desk and wing enclosure functioning as a sound barrier on three sides of the desk. On the desk is an instrument for reproducing the sound-modulating light beam emitting sources. A mast is supported by the carrel and extends well above the carrel, supporting at its top a universally-mounted selector tube which is movable to a position in axial alignment with any of the light beam emitting sources. Electrical connections from the selector tube lead to the instrument so that a student sitting behind the carrel can move the tube to a selected light emitting source and thereby have reproduced in the instrument before him the sounds controlled by the sound-modulated light beam emitting source. The mast extending at an elevation enables the student to receive the beamed message without interference by the walking of persons through the chamber and between the carrel and the sources. The carrel is provided at its forward side with a transparent panel extending upwardly and rearwardly, thus reducing glare from the light sources while also trapping ambient sound within the carrel.

---

This invention relates to a study carrel and electronic study system associated therewith, and more particularly to a study carrel equipped with means for selectively picking up sound modulated light beams and for reproducing the sound within a study desk enclosure while also providing for free vision through at least one portion of the enclosure.

For many decades, there has been a need for study carrels enabling a large number of students to work independently in a large hall, library or other area while at the same time providing means for the student to select from a number of lecture, etc. sources, all of the information being obtained and utilized by a student without interferring with the studies of other student in the area.

A primary object, therefore, is to provide study carrels and associated electronic equipment for accomplishing the above described results. Another object is to provide means and methods by which students can study independently and with selective control of information sources. A further object is to provide a carrel structure providing sound barrier means while permitting good visibility through at least a portion of the barrier. A still further object is to provide a carrel with means for supporting at an elevated height above the carrel enclosure, selective scope or tube means for receiving sound-modulated light beams from a plurality of sources and reproducing the original sound within the carrel enclosure and adjacent the student. A yet further object is to provide such a carrel with a transparent, inclined sound barrier which permits the student to directly observe a television screen or live demonstration, etc. Another object is to provide in such a system a selector tube or scope which is movably supported for axial alignment with one of a plurality of light beam-emitting sources, the tube being equipped with means for screening out undesired rays and for concentrating light beams upon an electric beam-responsive cell. Other specific objects and advantages will appear as the specification proceeds.

The invention is shown, in an illustrative embodiment, by the accompanying drawings, in which—

FIG. 1 is a perspective view of a study carrel in combination with sound-modulated light beam-emitting sources and a television screen, etc.; FIG. 2, a perspective view of a mast supporting a selector scope and sound reproducing mechanism, etc.; FIG. 3, a broken vertical sectional view of the carrel structure shown in FIG. 1; FIG. 4, an enlarged part-sectional view of the selector tube structure; and FIG. 5, a transverse sectional detail view, the section being taken as indicated at line 5—5 of FIG. 4.

In the illustrations given, 10 designates a carrel structure providing a desk and a shelf 12 below the desk. The carrel is provided with support pedestals 13, and a chair 14 for use by the student is also provided with support pedestals 15. By means of connecting bars 16 and 17, both the chair 14 and the carrel 10 are supported by the pedestals 13 and 15. It will be understood that any suitable support means may be employed for the carrel 10 and the chair 14.

The carrel 10 is provided with side panels 18 which are preferably formed of sound barried material and with a transparent, upwardly and rearwardly inclined front panel 19. The front panel 19, which may be formed of glass, transparent plastic, or other suitable material, because of its upward and rearward inclination, not only reduces glare for visual activities, but also effectively traps ambient sound within the carrel. As shown best in FIG. 1, the student may observe through the transparent panel 19 the screen of a television instrument 20 or may observe a laboratory or other demonstration, etc.

Mounted upon the top of the front wall of the chamber, as shown best in FIG. 1, are a plurality of light beam-emitting sources 21. The use of a sound-modulated light beam transmitter is well known. It comprises a gas-filled bulb and mechanism by which sound applied thereto causes light beams to be emitted and which serve as a carrier of sound in that the modulated light beams are picked up by a selector solar cell and a sound reproduction mechanism is actuated for reproduction of the original sound. In practice, the sound is fed into the source system by a tape deck, phonograph, or microphone, and the modulated light beams are then transmitted from the separate and spaced-apart beam emitter sources 21. Since the structure and operation of a single sound-modulated light beam transmitted is well known, a further detailed description is believed unnecessary. In our system, however, instead of employing a single light beam transmitter, we employ a plurality of them and in spaced-apart relation, as shown best in FIG. 1. It will be understood that the light beam emitter devices 21 may be arranged in a horizontal bank or may be spaced apart in other angular relations. We prefer, however, to have such emitter devices arranged at an elevated position so that they function above the heads of students, instructors, and other persons walking in the hall.

For selectively picking up the light beams from any one of the sources 21, we provide a selector tube 22 which is mounted upon a mast 23 carried by the carrel 10. The mast may be anchored to the carrel by a brace 23a. We prefer a mast which supports the selector tube 22 well above the enclosure panels 18 and 19 of the carrel 10, and preferably at an elevation which avoids interference by the walking of persons through the chamber, at least near the front wall of the chamber.

The shaft 23 may, if desired, be provided with telescoping parts for vertical adjustment and, in the illustration shown, is carried by a sound reproducing instrument 24, which rests upon the desk 11. The tube 22 is supported by a block member 25 equipped with a depending bracket member 26 provided with a horizontal pivot pin 27 extending through an upper, rotatively-mounted member carried by the mast 23 so as to permit universal movement of the scope or tube 22. It will be understood that any suitable means for rotatively and swingably mounting the scope upon the mast 23 may be employed, and, if desired, remote means within the carrel enclosure may be employed for shifting the scope so as to readily align it with one of the selected light beam-emitting sources. In the specific illustration given, a handle 28 is provided for manipulating the scope. For facilitating the alignment of the scope or tube 22 with a selected beam emitter 21, a sight 29 is provided at the front end of the tube 22.

The structure of the tube 22 is shown best in FIGS. 4 and 5. In this structure, the tube is provided at its forward end with a light filter member 30. The light filter may be employed for filtering our infra-red rays or for other undesired rays while permitting the passage of the modulated light beams through the forward open end of the tube 22. At the rear of the tube 22 is a reflector 31 which directs the light beams inwardly and centers them upon a solar cell 32 or an electric cell which is responsive to the modulated light beams. Electrical connections 33 from the cell 32 are brought downwardly through the mast to the sound-reproducing mechanism 24. The sound-reproducing mechanism 24 is a known instrument which is actuated by the current flow from the cell 32 and reproduces sound therefrom corresponding to the sound which originally modulated the light beams in the transmitter 21.

The instrument 22 is provided with a speaker 34 which is preferably supported by the flexible member 35 so as to normally be adjacent the ear of the student. If desired, earphones may be substituted for the speaker 34. In the illustration given best in FIG. 2, the instrument is provided also with a microphone 36 so that, for example, when the student is studying a language and hears the foreign word through the speaker 34, he may repeat the word over the microphone 36 and hear his spoken voice through the speaker 34. Since such sound-reproducing instruments and the speaker and microphone structures are well known in the art, a further detailed description herein is believed unnecessary.

The electronic system in the carrel may, if desired, be battery-powered, thus facilitating the movement of the carrel to different positions on the lecture hall floor, etc. It is found that a 6-volt, 4 standard D Cell flashlight type of battery is satisfactory for powering the electronic system.

*Operation*

In the operation of the structure and learning method, the student may be seated, as illustrated best in FIG. 3, so she is sheltered within the sound barrier provided by the wings of the carrel and with the speaker adjacent the ear of the student. The student may move the selector tube 22 to bring it into alignment with one of the sources 21, and the tube, equipped with the light filter and with the reflector system shown, screens out beams from other of the light-emitting sources 21. The information flowing from a particular source is thus fed through the system to the student. At the same time the student may observe through the transparent panel 19 the program on a television screen or other classroom demonstration, etc. If a language tape is being used in the source 21 employed, the student can respond using the microphone 36.

In the foregoing operation, the modulated light beam is produced from a tape deck, phonograph or microphone, etc., being normally fed into a program amplifier and sent to the modulator. The exciter modulator modulates a carrier with the audio signal and transmits this signal via the gas-filled bulb. The receiver in the selector tube 22 receives the light signal by means of its solar cell 32 and the focusing mirror reflector 31, and from the cell the signal is fed into the audio amplifier and can be heard through the speaker 34 or headphones, if desired.

While in the foregoing specification we have set forth specific structure and procedure in considerable detail for the purpose of illustrating modifications of our invention, it will be understood that such details may be varied widely by those skilled in the art without departing from the spirit of our invention.

We claim:

1. In electronic study apparatus in which a plurality of spaced-apart sound-modulated light beam emitting sources are arranged at an elevation in a study chamber and a carrel in said chamber faces said sources, said carrel providing a desk and wing enclosure functioning as a sound barrier on at least three sides of said desk and being provided with an instrument on said desk having electrical connections for reproducing in sound light beams from said sources, the improvement which comprises mounting a selector tube on a mast supported by said carrel and at an elevation above said carrel, said tube being provided with a light beam responsive electric cell and being movable to a position in axial alignment with one of said light emitting sources, and electrical connections from said cell to said instrument on said desk.

2. The structure of claim 1 in which said selector tube is tiltably and rotatably mounted upon said mast.

3. The structure of claim 1 in which said mast is mounted upon said instrument and said electrical connections extend through said mast to said instrument.

4. The structure of claim 1 in which said enclosure is formed by front and side panels and said front panel is transparent and inclined upwardly and rearwardly.

References Cited

UNITED STATES PATENTS

| | | | |
|---|---|---|---|
| 2,100,348 | 11/1937 | Nicolson | 250—199 |
| 2,153,709 | 4/1939 | Bournisien | 250—199 |
| 2,494,645 | 1/1950 | Collins | 250—199 |
| 2,961,280 | 11/1960 | Jentzen. | |
| 3,069,789 | 12/1962 | Knight et al. | 35—35.3 |
| 3,111,587 | 11/1963 | Rocard | 250—199 |
| 3,233,346 | 2/1966 | Cornberg | 35—60 |
| 3,245,157 | 4/1966 | Laviana | 178—5.8 X |

ROBERT L. GRIFFIN, *Primary Examiner.*